United States Patent
Nakagawa et al.

(10) Patent No.: US 7,419,433 B2
(45) Date of Patent: Sep. 2, 2008

(54) ATV DRIVE SHAFT AND CONSTANT VELOCITY JOINT

(75) Inventors: Tohru Nakagawa, Shizuoka-ken (JP); Hiroshi Tone, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 416 days.

(21) Appl. No.: 11/132,418

(22) Filed: May 19, 2005

(65) Prior Publication Data

US 2005/0261066 A1    Nov. 24, 2005

(30) Foreign Application Priority Data

| May 24, 2004 | (JP) | ............................. 2004-153788 |
| May 24, 2004 | (JP) | ............................. 2004-153914 |
| May 24, 2004 | (JP) | ............................. 2004-153920 |

(51) Int. Cl.
*F16D 3/00* (2006.01)

(52) U.S. Cl. ....................................... 464/145; 464/906
(58) Field of Classification Search ................. 464/145, 464/906
See application file for complete search history.

(56) References Cited

U.S. PATENT DOCUMENTS

2005/0070364 A1*    3/2005    Matsumoto et al. ......... 464/145

* cited by examiner

*Primary Examiner*—Aaron Dunwoody
(74) *Attorney, Agent, or Firm*—Arent Fox LLP

(57) ABSTRACT

An ATV drive shaft which can be produced at low costs is provided. In a drive shaft installed in an uneven terrain traversing, mounted type vehicle and adapted to transmit drive power to wheels through constant velocity joints J1 and J2 on the inboard and outboard sides, a double offset type constant velocity joint J2 is used on the inboard side and an undercut free type constant velocity joint J1 is used on the outboard side, and the track clearances of the constant velocity joints J1 and J2 are in the range of 20 μm-200 μm.

19 Claims, 8 Drawing Sheets

ATV DRIVE SHAFT AND CONSTANT VELOCITY JOINT

BACKGROUND OF THE INVENTION

1. Field of the Invention

The present invention relates to an ATV (All Terrain Vehicle: an uneven terrain traversing, mounted type vehicle, also called four-wheeled buggy car) drive shaft and to an undercut free type constant velocity joint disposed on the outboard side of a drive shaft for a vehicle having no power steering.

2. Detailed Description of the Prior Art

As is known in the art, in automobiles having no power steering and various vehicles similar thereto, constant velocity joints capable of transmitting rotational power at constant velocity even when there is an angular or axial displacement between two shafts have been installed in a power transmission path for transmission of drive power from the engine to wheels. As an example of a vehicle having such power transmission path, a so-called ATV which is an uneven terrain traversing, four-wheeled or three-wheeled, mounted type vehicle, equipped with balloon tires and designed to freely traverse wastelands, sandy beaches and the like has come to be widely known.

The power transmission device for these various vehicles will be explained with said ATV used as a representative example. As conceptually shown in FIG. 6, the power from an engine 21 is outputted from the output shafts on the front and rear sides via a speed change mechanism in the interior and is inputted to differential gears 24 and 25 on the front and rear sides via power transmission means 22 and 23, such as chains or propeller shafts. And, the engine power inputted to the differential gears 24 and 25 is reduced in speed by the mechanism of the differential gears 24 and 25 and is converted to a rotational power orthogonal thereto, whereupon it is transmitted to the wheels 28 and 29 through left and right drive shafts 26 and 27. In the example shown in the same figure, constant velocity joints are used for joints A between the drive shaft 26 on the front side and the differential gear 24 and for joints B in the wheels 28. In addition, there are cases where constant velocity joints are used for joints C between the drive shaft 27 on the rear side and the differential gear 25 and for joints D in the wheels 29. Further, when propeller shafts are used as the power transmission means 22 and 23, there are cases where constant velocity joints are used for joints E and F between the propeller shafts and the output shafts of the engine (speed change mechanism) 21 and joints G and H in the differential gears 24 and 25.

FIG. 7 shows the drive shaft 26 on the front side. In order to allow the drive shaft 26 to make angular displacement and axial displacement following the movement of the wheel 28 during cornering, traversing uneven terrains or the like movement, a slide type constant velocity joint (a constant velocity joint allowing angular displacement and axial displacement between two shafts) 30 and a fixed type constant velocity joint (a constant velocity joint allowing angular displacement between two shafts) 31 are used in pair for joining the drive shaft 26. In the example shown in the same figure, one end (the inboard side) of the drive shaft 26 is joined to the differential gear 24 (at the joint A) through the slide type constant velocity joint (a double offset type constant velocity joint, hereinafter referred to as "DOJ") 30, while the other end (the outboard side) of the drive shaft 26 is joined to the wheel 28 (at the joint B) through a fixed type constant velocity joint (Rzeppa type constant velocity joint: ball fixed joint, hereinafter referred to as "BJ") 31.

Heretofore, as said DOJ and BJ for vehicles such as ATVs, those for passenger cars have been frequently converted to be used as such. And, in vehicles small in size and narrow in width, such as ATVs, it is suitable to use a drive shaft which is light-weight and compact and which has satisfactory operability. To meet such demand, Japanese Patent Laid-Open 2001-97063 which follows, for example, discloses the use of a double offset type constant velocity joint (DOJ) on the inboard side and an undercut free type constant velocity joint (hereinafter referred to as "UJ") on the outboard side, in a drive shaft for transmitting drive power to wheels through constant velocity joints on the inboard and outboard sides.

The UJ disposed on the outboard side of this drive shaft, basically, as shown in FIG. 8, comprises an outer joint member 12 with a spherical inner peripheral surface 12a formed with a plurality of track grooves 13, an inner joint member 14 with a spherical outer peripheral surface 14a formed with a plurality of track grooves 15, a plurality of torque transmitting balls 16 disposed in ball tracks formed by the opposed track grooves 13 and 15 of both joint members 12 and 14, and a cage 18 interposed between both joint members 12 and 14 and formed with a plurality of pockets 17 holding the torque transmitting balls 16.

And, it is stated in said Document that the track offset angle of the UJ is set at 5°-7° and that the cage offset amount of the UJ is set at 0, and that with a conventional UJ, the cage offset angle has been set at not less than 1°. That is, in this UJ, as shown in FIG. 8, the centers Oaa and Obb of track grooves 13 and 15 of the outer and inner joint members 12 and 14 are offset by an equal distance Laa to axially opposite sides with the joint center O used as a reference. A track offset angle $\phi aa$ (an offset angle at the track grooves 13 and 15) consisting of $\angle OaaQO$ (or $\angle ObbQO$) is set at 5°-7°. In this case, since the cage offset amount is 0, the Lcc in the figure is 0. Further, in the conventional UJs, the centers Occ and Odd of the inner and outer spherical surfaces 18a and 18b of the cage 18, respectively, are offset by an equal distance to the axially opposite sides with the joint center O used as a reference. A cage offset angle $\phi cc$ (the offset angle of each of the spherical surfaces 18a and 18b of the cage 18) consisting of $\angle OddQO$ (or $\angle OccQO$) is set at not less than 1°. In addition, in the following description, the sum of the track offset angle and the cage offset angle $\phi cc$ will be referred to as the total offset angle ($\phi aa$ shown in FIG. 8). Therefore, the track offset amount in FIG. 8 is an amount (Laa−Lcc) obtained by subtracting the cage offset amount Lcc from the total offset amount Laa.

Further, in a conventional UJ, in order to improve the function of a cage 18 to guide torque transmitting balls 16 and from the standpoint of attaching importance to the securement of constant velocity nature of the joint, the axial clearance δ between a pocket 17 of the cage 18 and the torque transmitting ball 16, that is, the value δ obtained by subtracting the diameter of the torque transmitting ball 16 from the axial width of the pocket 17 is set so that δ<0 (negative clearance) to give an interference between the pocket 17 and the torque transmitting ball 16, which has been common practice. In this case, when the axial clearance δ is small (excessively negative), the torque transmitting balls 16 can hardly roll on the ball tracks and in the pockets 17, a fact which is disadvantageous from the standpoint of rotational resistance when this type of joint transmits torque while taking a working angle; thus, adversely affecting steerability. In contrast, when the axial clearance δ is made large (positive clearance is made excessively large), the rollability of the torque transmitting balls 16 is enhanced to reduce the rotational resistance, but the guiding function of the cage 18 for the torque transmitting balls 16 is impaired to break constant velocity nature of this type of joint, leading to abnormal sound and a feeling of being caught during steering, and hence to a deterioration in steering feeling. In addition, Japanese Patent Laid-Open Nos. 2000-266071 and 2002-5186 specify the axial pocket clearance δ of a constant velocity joint installed in general automobiles including passenger cars, not a constant velocity joint installed in vehicles having no power steering represented by ATVs which are the subject of the invention.

Since car body weight restrictions for ATVs are severe, further weight reduction and size compaction are required of drive shafts therefor. Further, ATVs are small in size, narrow in width and high in height, so that constant velocity joint installed in the drive shaft has its normal working angle reaching as much as about twice that in passenger cars. For this reason, with passenger car specifications, there may be the danger of the operating stability of the constant velocity joint being impaired depending on usage conditions and the like. Further, with ATV constant velocity joints, about ½ of the durability (life) of passenger cars and the like is sufficient as considered from balance between market performance and the term of guarantee. Therefore, as considered on the basis of passenger car specifications as they are, there is a feeling of excessive quality. As to the rpm used, about half for passenger car specifications is sufficient as considered from balance with vehicle speed, and the same may be said. On the other hand, the same degree of strength including twist strength as that for passenger car specifications is required.

SUMMARY OF THE INVENTION

With such points in mind and with attention paid to the situation peculiar to ATVs, the first problem of the invention is to provide an ATV drive shaft which can be produced at low costs.

Further, in the UJ disposed on the outboard side of a drive shaft in a vehicle having no power steering represented by ATVs, it is known in the art that when said total offset angle is increased, the operability and hence steerability of the UJ are improved. However, when the track offset angle is excessively increased, the track grooves 13 on the outboard side of the outer joint member 12 become excessively shallow, a fact which accounts for the presence of said offset angle to compensate for the deficiency of the track offset angle after the track offset angle has been set to be excessively small. Therefore, when it is desired to secure a sufficient total offset angle, it is extremely advantageous from the standpoint of design to provide a cage offset angle in addition to the track offset angle. In this case, when the cage offset angle is 0°, as described in Japanese Patent Laid-Open No. 2001-97063, the deficiency of the track offset angle cannot be compensated for, a fact which is disadvantageous from the standpoint of design. On the other hand, as described in said document, in the case where the cage offset angle is not less than 1°, it is desirable from the standpoint of design to increase also the track offset angle with consideration given to geometric balance with the cage offset angle. In the case where the track offset angle is increased on the basis of such design concept so as to correspond to a cage offset angle not less than 1°, the outboard-side track grooves of the outer joint member become shallow, as already described, not only increasing the percentage of risk of the torque transmitting balls running up onto the shoulder but also hindering size and weight reductions of the UJ.

With such point in mind, the second problem of the invention is, by making suitable the cage offset angle of the UJ disposed on the outboard side of the drive shaft for a vehicle having no power steering, to lower the percentage of risk of the torque transmitting balls running up onto the shoulder and to attain size and weight reductions of the UJ while maintaining good operability of the UJ after appropriately compensating for the deficiency of the track offset angle.

In the UJ disposed on the outboard side of a drive shaft in a vehicle having no power steering represented by ATVs, a method of producing the cage thereof has been employed which comprises the steps of forming a basic shape for the cage as by press work, effecting window-punching for pockets, and applying heat treatment. With this method, however, because of the window-punching for pockets being special or due to deformation or the like after heat treatment, the inner peripheral surfaces of the pockets are formed with strains or tapers or dimensional errors, the actual circumstances being such that the axial pocket clearance δ has to be set, for example, at about −60 μm or set to be further reduced. For this reason, the axial pocket clearance δ becomes excessively small, not only leading drawbacks including an unreasonable increase in the bending resistance during steering or in the load but also causing the axial pocket clearance δ, reversely, to become a positive clearance due to dimensional errors or the like in the pockets, producing the fear of incurring a situation in which the operability or constant velocity nature of this kind of joint is broken. That is, since this kind of vehicle has no power steering, said axial pocket clearance δ produces large influences on the bending resistance and steerability of the steering wheel. Despite this, in the prior art, the actual circumstances have been such that the axial pocket clearance δ is not set in a suitable range prepared for vehicles that have no power steering.

With such point in mind, the third problem of the invention is to set at a suitable value the axial pocket clearance δ of the UJ disposed on the outboard side of a drive shaft for a vehicle having no power steering, thereby avoiding degradation of steerability due to increased bending resistance or load during steering and simultaneously avoiding a deterioration in steering feeling due to incurring abnormal sound, a feeling of being caught during steering, and the like.

The invention accomplished in order to solve the first problem (the first technical means) provides a drive shaft installed in an uneven terrain traversing, mounted type vehicle and adapted to transmit drive power to wheels through constant velocity joints on the inboard and outboard sides, the drive shaft being characterized in that a double offset type constant velocity joint is used on the inboard side and an undercut free type constant velocity joint is used on the outboard side and the track clearance of said constant velocity joints is in the range of 20 μm-200 μm.

Here, the track clearance means the difference between the PCD of the track grooves of the outer joint member (outer ring) and the PCD of the track grooves of the inner joint member (inner ring). The track clearance is provided to enable the assembling of the outer and inner joint members. Conventionally, the track clearance has been held down to be as small as possible. For this reason, a matching operation has been necessary which comprises the steps of measuring the PCDs of the track grooves of the outer and inner joint members, classifying the PCDs according to rank on the basis of a width of about 20 μm, selecting from a plurality of combinations of outer and inner joint members a pair of outer and inner joint members such that the track clearance is about 20 μm-60 μm for UJs and about 20 μm-80 μm for DOJs. The track grooves of the inner and outer joint members in this case are finished by cold forging.

For example, in the case of a conventional UJ, a set of processing steps, forging→turning→serrating→thread rolling→high frequency hardening→matching→spherical surface grinding, have been employed for the outer joint member. Further, the inner joint member has been produced through a set of processing steps, forging→turning→serration broaching→carburizing and quenching→spherical surface grinding→tumbling→matching.

In contrast, in the case of a UJ used for an ATV drive shaft in the, the outer joint member is produced through a set of processing steps, forging→turning→serrating→thread rolling→high frequency hardening→spherical surface grinding, matching being dispensed with. Further, the inner joint member is produced through a set of processing steps, forging→turning→serration broaching→carburizing and quenching→spherical surface grinding; in this case, matching is also dispensed with and tumbling is eliminated. In addition, tumbling is inserted in the final step for the inner joint member and cage to remove burrs from the edges. Thus, elimination of tumbling would result in the burrs being removed from the edges to cut into the rolling surface during the operation of the joint, thereby degrading durability and operability. However, in consideration of the facts that the degradation of durability is allowed to some extent and that elimination of matching results in securing a sufficient track clearance, it is believed that there is little influence of the burrs cutting into the rolling surface.

In other words, the invention employs a large track clearance between the outer and inner joints, thereby making it possible to eliminate matching. Therefore, in the ATV drive shaft of the invention, the outer and inner joint members having their track grooves finished by cold forging can be used without performing matching. In this connection, the PCD is measured such that the PCD in an optional axial position, usually an axial vertical section in the vicinity of the joint center is measured using an exclusive measuring instrument. Since the track groove is forge-finished, measured values of the PCD somewhat vary according to axial position.

The basis for setting the lower limit of the track clearance at 0.020 mm is as follows. Since the track grooves are finished by cold forging, the costs are low; however, the track shape accuracy is somewhat inferior as compared with that for finish by grinding. Specifically, they are inferior in PCD dimension variation accuracy and PCD shape axial accuracy (undulations). If the track grooves are finished by grinding, the lower limit of the PCD clearance can be reduced to about 5 μm, but 20 μm is the limit with consideration given to processing capacity. A further reduction in the lower limit would degrade the incorporation and operation of balls.

The basis for setting the upper limit of the track clearance at 0.2 mm is as follows. In a conventional UJ, selection of PCDs, with tracks as well, of the outer and inner joint members is made on the basis of a width of 20 μm, a fact which accounts for the fact that the upper limit of the conventional track clearance is the lower limit value (20 μm)+the outer and inner joint member PCD maximum clearance (20 μm+20 μm)=60 μm. Similarly, in the case of a conventional DOJ, the PCD selection width of the outer joint member tracks is 20 μm and the PCD selection width of the inner joint member tracks is 40 μm, and on the basis of the same way of thinking as for the UJ, the upper limit is set at 80 μm. In the invention, in the case of a DOJ, the maximum clearance for the existing PCD rank is taken as the upper limit. Specifically, it is the difference between +75 μm which is the PCD rank maximum value of the outer joint member and −125 μm which is the PCD rank minimum value of the inner joint member, the result being 200 μm (0.2 mm). That is, this track clearance is the value obtained when the upper and lower limit articles of the existing matching rank are combined, and if this track clearance can be allowed, this means that matching can be eliminated. When the UJ is investigated in the same way of thinking, the outer joint member maximum value is +76 μm and the inner joint member minimum value is −98 μm, the sum being 174 μm, which falls within said upper limit 200 μm. In addition, there is no need to further increase the upper limit because sufficient productivity is ensured when the situation is investigated with consideration given to processing capacity. Evaluation of durability and abnormal sound is made at this upper limit, and no problem has been found; thus, the upper limit is employed.

Further, the invention accomplished in order to solve the second problem (the second technical means) provides an undercut free type constant velocity joint comprising an outer joint member disposed on the outboard side of a drive shaft for transmitting drive power to a wheel in a vehicle with no power steering (for example, an ATV) and having a plurality of track grooves in a spherical inner peripheral surface, an inner joint member having a plurality of track grooves in a spherical outer peripheral surface, torque transmitting balls disposed in a plurality of ball tracks formed by the opposed track grooves of both joint members, and a cage interposed between both joint members and receiving and holding said torque transmitting balls in a plurality of window-shaped pockets, the undercut free type constant velocity joint being characterized in that the track groove centers of said outer and inner joint members and the inner and outer spherical surface centers of said cage are axially offset with the joint center serving as a reference and in that the offset angles of the spherical surfaces of said cage are set to be greater than 0° but less than 1°.

With such arrangement, since the offset angles of the spherical surfaces on the inner and outer peripheral sides of the cage in the UJ of a vehicle with no power steering, that is, the cage offset angles are set to be greater than 0°, the deficiency of the track offset angle can be compensated for, a fact which is advantageous from the standpoint of design, making it possible to enjoy the advantages obtained by providing a total offset angle in a suitable degree, without unreasonably shallowing the track grooves on the outboard side of the outer joint member. Furthermore, since the cage offset angles are set to be less than 1°, the track grooves on the outboard side of the outer joint member can be deepened in a suitable degree while satisfactorily maintaining geometric balance between the cage offset angle and the track offset angle, thereby lowering the percentage of risk of the torque transmitting balls running up onto the shoulder to improve durability and making it possible to attain size and weight reductions. Additionally, increasing the offset angle increases the axial local material amount of the cage, degrading the pocket-punching quality. However, with the cage offset angle set to be less than 1° as described above, satisfactorily maintaining geometric balance with the track offset angle makes it possible to effectively avoid occurrence of such drawback. With the above situation taken into account, the cage offset angle may be 0.5°-0.8°.

In the arrangement of the second technical means, the offset angles of the track grooves in the outer and inner joint members may be set at 4°-6° or 5°-5.3°.

With the arrangement thus made, with consideration given to the fact that the cage offset angle is set to be greater than 0° but less than 1°, as described above, the offset angles of the track grooves, that is, the total offset angle including the track offset angle can be the optimum angle for attaining the lowering of the percentage of risk of the torque transmitting balls running up onto the shoulder, size and weight reductions of the UJ, and improvements in operability or steerability, all at one.

In the arrangement connected with the second technical means, the inboard-side end of the cage may project from the inboard-side end of the outer joint member with the working angle at 0°.

With the arrangement thus made, the widthwise dimension of the cage can be made relatively long, so that sufficient widthwise material sections can be formed on widthwise opposite sides of the cage pocket, a fact which, coupled with the setting of the offset angle at a suitable value as described above, makes it possible to improve the durability of the cage.

In the arrangement connected with the second technical means, the plurality of window-shaped pockets of the cage may be all the same in size.

That is, in the prior art, when, in incorporating the inner joint member into the cage, for example, a method is employed in which incorporation is performed with the convex portions between adjacent track grooves of the inner joint member inserted in the pockets of the cage, a situation is incurred in which special pockets used for insertion of the convex portions have to be made greater than the other pockets. When such incorporation method is not employed, all pockets can be made the same in size without unreasonably enlarging them. Therefore, a local decrease in strength of the cage can be prevented, a fact which, coupled with the setting of the offset angle at a suitable value as described above, makes it possible to further improve the durability of the cage.

The constant velocity joint having the arrangement connected with the second technical means may be installed in an uneven terrain traversing, mounted type vehicle (ATV).

Further, the invention accomplished in order to solve the third problem (the third technical means) provides an undercut free type constant velocity joint comprising an outer joint member disposed on the outboard side of a drive shaft for transmitting drive power to a wheel in a vehicle with no power steering and having a plurality of track grooves in a spherical inner peripheral surface, an inner joint member having a plurality of track grooves in a spherical outer peripheral surface, a plurality of torque transmitting balls disposed in ball tracks formed by the opposed track grooves of both joint members, and a cage interposed between both joint members and receiving and holding said torque transmitting balls in a plurality of window-shaped pockets, the undercut free type constant velocity joint being characterized in that the axial clearance $\delta$ between the cage pocket and the torque transmitting ball is set so that $-30\ \mu m \leq \delta \leq 0\ \mu m$.

According to such arrangement, the axial pocket clearance $\delta$ is set in a suitable range for the constant velocity joint (UJ) disposed on the outboard side of a drive shaft in a vehicle, such as an ATV, having no power steering, thereby effectively avoiding degradation of steerability due to increased bending resistance or load during steering and a deterioration in steering feeling due to incurring abnormal sound, a feeling of being caught during steering, and the like, all at once. That is, if the axial pocket clearance $\delta$ were less than $-30\ \mu m$ ($\delta < -30\ \mu m$), it would become difficult for the torque transmitting balls to roll in the pockets, unreasonably increasing the bending resistance or load when this kind of joint takes a working angle, thus adversely affecting steerability. On the other hand, if the axial pocket clearance $\delta$ were greater than $0\ \mu m$ ($\delta > 0\ \mu m$), the guiding function of the cage for the torque transmitting balls would be impaired to break the operability or constant velocity nature of this type of joint, leading to abnormal sound and a feeling of being caught during steering, and hence to a deterioration in steering feeling. Therefore, with the axial pocket clearance $\delta$ set in said numerical range, suitable operations of the joint are performed in this kind of vehicle. With such matter taken into account, the upper limit of the axial pocket clearance $\delta$ may be set at $0\ \mu m$ ($\delta < 0\ \mu m$) and the lower limit at $-20\ \mu m$ ($\delta \geq -20\ \mu m$).

In the arrangement of the third technical means, the cage is made of steel, and the inner peripheral surfaces of its pockets may be formed by cutting or grinding the original, hardened, inner peripheral surfaces of the pockets.

With the arrangement thus made, a method of producing the cage is employed which comprises the steps of forming a basic shape for the cage made of steel as by press work, effecting window-punching for pockets, hardening, and cutting or grinding the original, inner peripheral surfaces of the pockets formed by said window-punching, to obtain the final inner peripheral surfaces of the pockets. Application of cutting or grinding after hardening in this manner makes it possible to form pockets which avoid, as much as possible, the inner peripheral surfaces of the pockets being formed with a taper or strains being produced, and suppress, as much as possible, variation, dimensional errors, and deformation; thus, suitable axial pocket clearance $\delta$ can be stably obtained.

In the arrangement connected with the third technical means, the inboard-side end of the cage may project from the inboard-side end of the outer joint member with the working angle at 0°.

With the arrangement thus made, the widthwise dimension of the cage can be made relatively long, so that sufficient widthwise material sections can be secured on widthwise opposite sides of the cage pocket, thus making is possible to improve the strength of the cage.

In the arrangement connected with the third technical means, the plurality of window-shaped pockets of the cage may be all the same in size.

That is, in the prior art, when, in incorporating the inner joint member into the cage, for example, a method is employed in which incorporation is performed with the convex portions between adjacent track grooves of the inner joint member inserted in the pockets of the cage, a situation is incurred in which special pockets used for insertion of the convex portions have to be made greater than the other pockets. When such incorporation method is not employed, all pockets can be made the same in size without unreasonably enlarging them. Therefore, a local decrease in strength of the cage can be prevented, and since all pockets can be made the same in size, processability during cutting or grinding of the pockets is improved.

The constant velocity joint having the arrangement connected with the third technical means may be installed in an uneven terrain traversing, mounted type vehicle (ATV).

As is clear from the above description, according to the invention (first technical means), since matching for the outer and inner joint members can be eliminated, it is possible to provide an ATV drive shaft which can be produced at low costs.

Further, according to the invention (second technical means), since the cage offset angle in the UJ for a vehicle having no power steering is set to be greater than 0° but less than 1°, the deficiency of the track offset angle can be compensated for, a fact which is advantageous from the standpoint of design, making it possible to attain a decrease in the percentage of risk of the torque transmitting balls running up onto the shoulder, size and weight reductions, improvements in operability and hence steerability, all at once.

Further, according to the invention (third technical means), since the axial pocket clearance $\delta$ for the UJ in a vehicle having no power steering is set so that $-30\ \mu m \leq \delta \leq 0\ \mu m$, degradation of steerability due to increased bending resistance or load during steering and a deterioration in steering feeling due to incurring abnormal sound, a feeling of being caught during steering, and the like, are effectively avoided all at once.

Embodiments of the invention will now be described with reference to the drawings.

DESCRIPTION OF THE PREFERRED EMBODIMENTS

Figure 1:
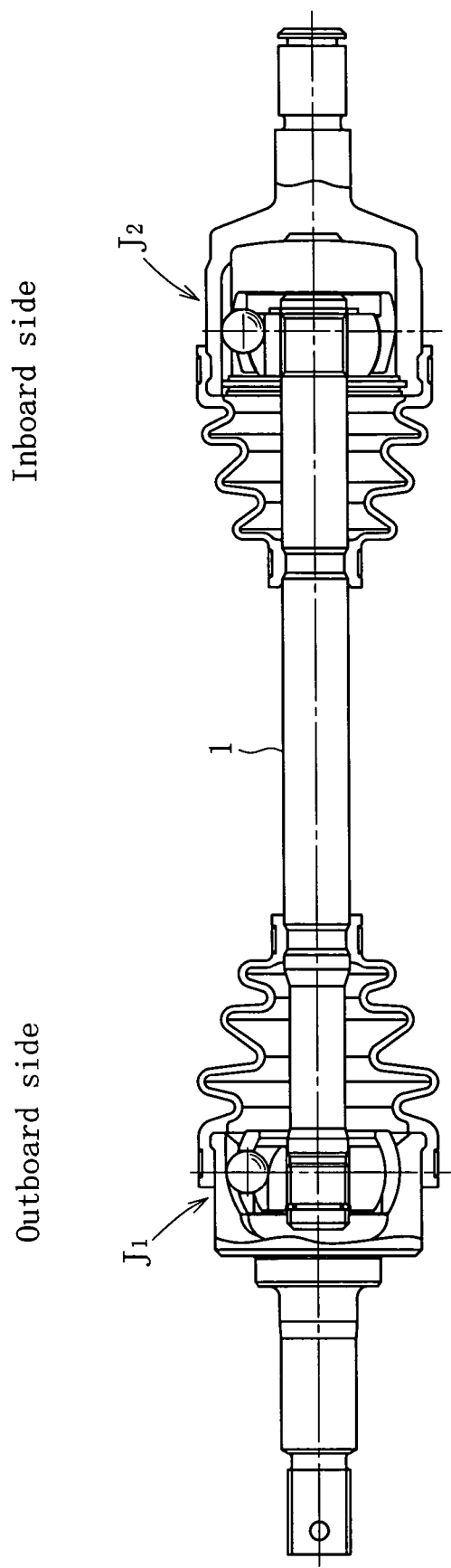
FIG. 1 is a longitudinal sectional view showing an ATV drive shaft according to an embodiment of the invention.
Figure 6:
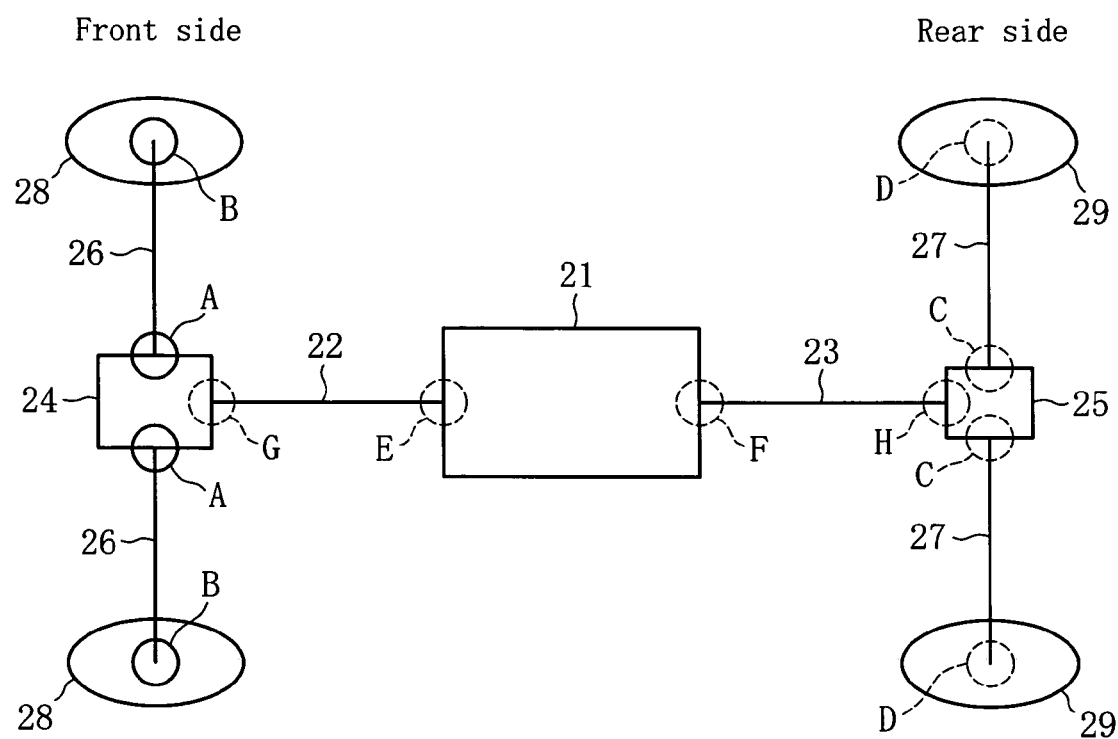
FIG. 6 is a conceptual view of an ATV power transmission device.
Figure 7:
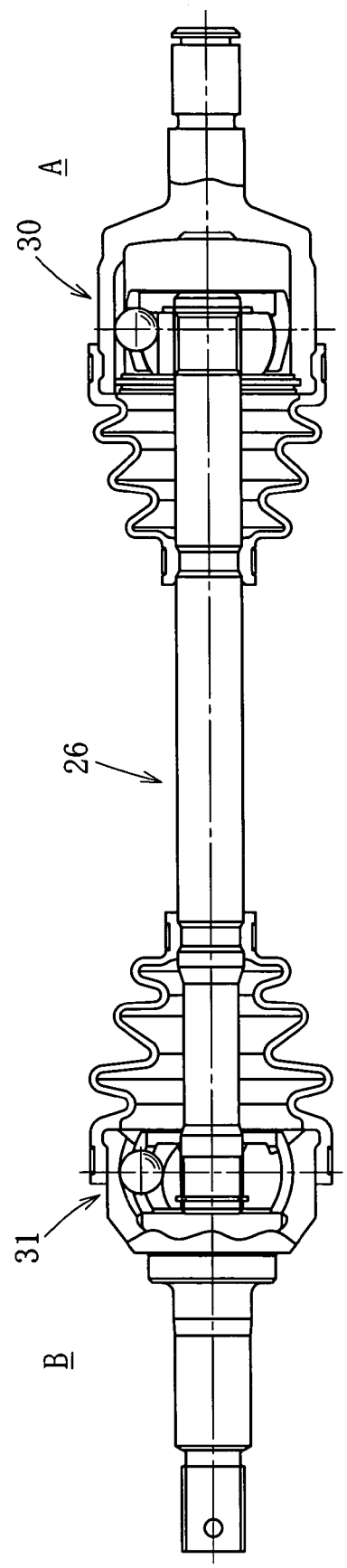
FIG. 7 is a longitudinal sectional view of a conventional ATV drive shaft.
Figure 8:
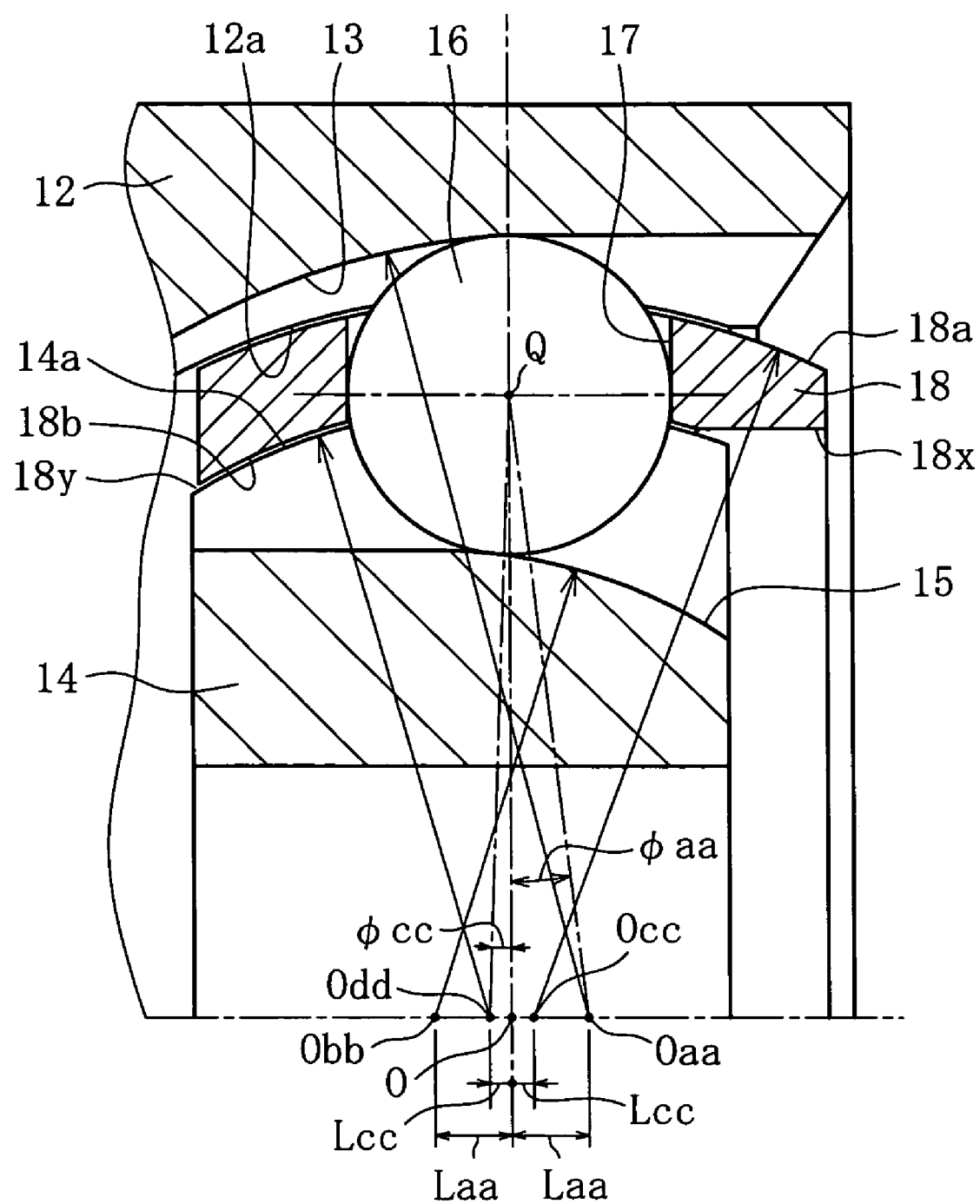
FIG. 8 is a longitudinal sectional view showing the principal portion of a conventional UJ.

An ATV drive shaft, as shown in FIG. 1, comprises a constant velocity joint $J_1$ on the outboard side, a constant velocity joint $J_2$ on the inboard side, and an intermediate shaft 1 for joining the two joints $J_1$ and $J_2$. The constant velocity joint $J_1$ on the outboard side is joined to a wheel, while the constant velocity joint $J_2$ on the inboard side is joined to a differential gear (see FIG. 6).

Figure 2:
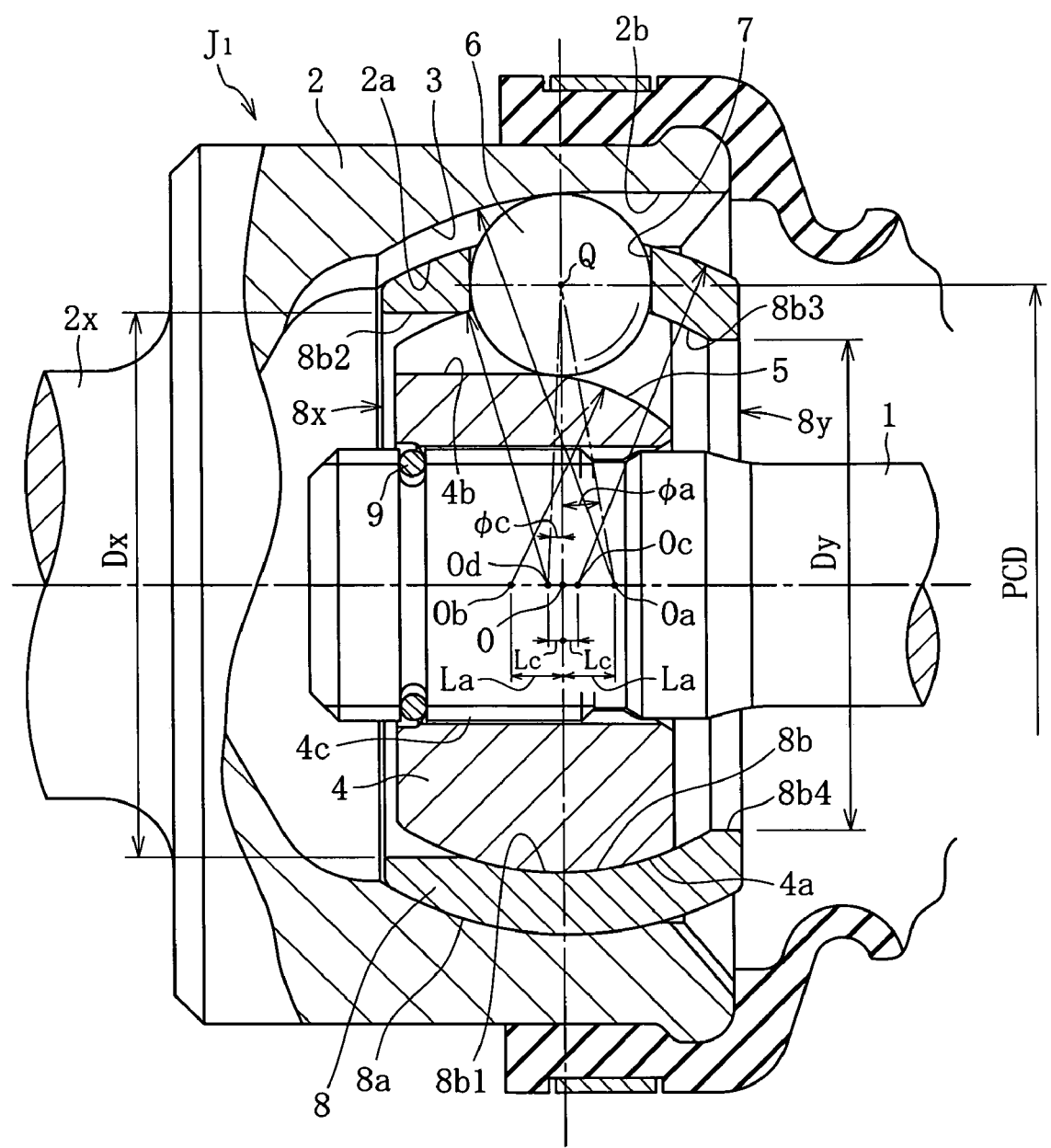
FIG. 2 is a longitudinal sectional view showing a UJ in the drive shaft of FIG. 1.

The constant velocity joint $J_1$ on the outboard side is constituted by an undercut free type constant velocity joint (UJ). FIG. 2 illustrates a state assumed when the working angle $\theta$ of the undercut free type constant velocity joint is 0°. This constant velocity joint $J_1$ comprises an outer joint member 2 (outer ring) with a spherical inner peripheral surface 2a axially formed with a plurality (six or eight) of bottom-curved track grooves 3, an inner joint member 4 (inner ring) with a spherical outer peripheral surface 4a axially formed with a plurality (six or eight) of bottom-curved track grooves 5, a plurality (six or eight) of torque transmitting balls 6 disposed in ball tracks formed by the opposed track grooves 3 and 5 of both joint members 2 and 4, and a cage 8 interposed between both joint members 2 and 4 and receiving and holding the torque transmitting balls 6 in a plurality of window-shaped pockets 7. And, the intermediate shaft 1 of the drive shaft (see FIG. 1) is joined to the inner joint member 4 through serrations 4c (or splines) formed in the inner periphery thereof, while a wheel-side member is joined to the stem 2x of the outer joint member 2.

As shown in FIG. 2, the ball track formed from the track groove 3 of the outer joint member 2 and the track groove 5 of the inner joint member 4 exhibits a shape (a wedge shape) which is wide in the inboard side (the right side in the same figure), gradually diminishing toward the outboard side (the left side in the same figure). In this case, the inboard-side region of the track groove 3 of the outer joint member 2, and the outboard-side region of the track groove 5 of the inner joint member 4 are formed with straight sections 2b and 4b, respectively, whose groove bottoms are linear as seen in a longitudinal section. The presence of the straight sections 2b and 4b results in the maximum working angle being set at 50°, which is greater than the conventional passenger car BJ maximum working angle (46.5°).

The center Od of the inner peripheral spherical surface 8b of the cage 8 is offset by a distance Lc taken axially from the joint center O to the outboard side. A cage offset angle $\phi c$ consisting of $\angle OdQO$ defined by the center Od of the inner peripheral spherical surface 8b, the center Q of the torque transmitting ball 6, and the joint center O, that is, the offset angle of the inner spherical surface 8b of the cage 8 is set greater than 0° but less than 1° (preferably, 0.5°-0.8°, and in this embodiment, 0.7°). Further, the center Oc of the outer peripheral spherical surface 8a of the cage 8 is offset by the same distance Lc as above taken axially from the joint center O to the inboard side. A cage offset angle consisting of $\angle OcQO$ defined by the center Oc of the outer peripheral spherical surface 8a, the center Q of the torque transmitting ball 6, and the joint center O is set greater than 0° but less than 1° (preferably, 0.5°-0.8°, and in this embodiment, 0.7°), in the same manner as above. In addition, though not shown, the diameter of the spherical inner peripheral surface 2a of the outer joint member 2, and the diameter of the inner peripheral spherical surface 8b of the cage 8 are smaller at their opposite ends than at their axial central regions, whereas the diameter of the outer peripheral spherical surface 8a of the cage 8, and the diameter of the spherical outer peripheral surface 4a of the inner joint member 4 are larger at their opposite ends than at their axial central regions. Thereby, the inner peripheral surface 2a of the outer joint member 2 and the outer spherical surface 8a of the cage 8 contact each other only at their axial opposite ends, and similarly, the inner spherical surface 8b of the cage 8 and the outer peripheral surface 4a of the inner joint member 4 contact each other only at their axial opposite ends.

On the other hand, the center Oa of the track grooves 3 of the outer joint member 2 is offset by a distance La taken axially from the joint center O to the inboard side. From a total offset angle $\phi a$ consisting of $\angle OaQO$ defined by the center Oa of the track grooves 3 of the outer joint member 2, the center Q of the torque transmitting ball 6, and the joint center O is found the track offset angle of the outer joint member 3, which is $\phi a - \phi c$. This offset angle of the track grooves 3 of the outer joint member 3 is set at 4°-6° (in this embodiment, 5°). Further, the center Ob of the track grooves 5 of the inner joint member 4 is offset by the same distance La as above taken axially from the joint center O to the outboard side, and the track offset angle of the inner joint member 4 found from a total offset angle consisting of $\angle ObQO$ defined by the center Ob of the track grooves 5 of the inner joint member 4, the center Q of the torque transmitting ball 6, and the joint center O is also set at 4°-6° (in this embodiment, 5°), in the same manner as above.

In this case, as described above, if the offset angles of the inner and outer peripheral spherical surfaces 8a and 8b of the cage 8, that is, the cage offset angle $\phi c$ is set to be greater than 0° (preferably, greater than 0.5°), the deficiency of the track offset angle can be efficiently compensated for, a fact which is advantageous from the standpoint of design, making it possible to secure a suitable total offset angle without unreasonably shallowing the track grooves 3 on the outboard side of the outer joint member 2.

Furthermore, since the cage offset angle $\phi c$ is less than 1° (preferably, less than 0.8°), the track grooves 3 on the outboard side of the outer joint member 2 can be suitably deepened while satisfactorily maintaining geometric balance between the cage offset angle φc and the track offset angle. This makes it possible to reduce the percentage risk of the torque transmitting balls 6 running up onto the shoulder to improve durability and to attain size and weight reductions of the constant velocity joint $J_1$.

Here, if the total offset angle were increased, the processability of the pockets 7 of the cage 8 would aggravate. However, when the cage offset angle φc is set to be less than 1°, as described above, satisfactorily maintaining geometric balance with the track offset angle ensures that drawbacks including aggravation of processability hardly occur.

Additionally, the offset angles of the track grooves 3 and 5 of the outer and inner joint members 2 and 4, that is, the track offset angles are set to be 4°-6°, so that if consideration is given to balance with the cage offset angle φc being set to be greater than 0° but less than 1°, as already described, then the total offset angle of the track offset angle and cage offset angle φc can be made to be an optimum angle which attains a decrease in the percentage of risk of the torque transmitting balls 6 running up onto the shoulder, size and weight reductions of the constant velocity joint $J_1$, improvements in operability or steerability, all at once.

In this connection, the diameter Dx of the opening 8x in the end of the cage 8 on the outboard side is set larger than the diameter Dy of the opening 8y in the end on the inboard side, the arrangement being such that the inner joint member 4 can be removably inserted in the cage 8 through the opening 8x on the outboard side. In this case, the diameter Dy of the opening 8y on the inboard side is set small with such a value that the inner joint member 4 cannot be removably inserted in the cage 8.

More specifically, whereas the outer peripheral surface 8a of the cage 8 is spherical substantially over the entire region (the region excluding the chamfered portions of the axial opposite ends), the inner peripheral surface 8b thereof is a spherical surface 8b1 in the axial central region (the region equal to or slightly larger than the axial width of the pocket 7), and the surface continuous with this spherical surface 8b1 is a cylindrical surface 8b2 on the outboard side and is a spherical surface 8b3 on the inboard side. In this case, the cylindrical surface 8b2 on the outboard side continuously extends to the end edge with substantially the same diameter, while the side which is further inboard of the spherical surface 8b3 on the inboard side is continuously formed with a cylindrical surface 8b4 which is smaller in diameter and in axial width than the cylindrical surface 8b2 on the outboard side.

Therefore, the thickness of the cage 8 gradually decreases as the cage extends from the axial central region to the outboard side, but is maintained constant or gradually increases due to cage offset as it extends for a predetermined distance from the axial central region to the inboard side. In other words, the average thickness of the inboard-side region, rather than the axial central region, of the cage 8 is set such that it is greater than the average thickness of the outboard-side region. Further, the area of contact between the inner peripheral surface 8b of the cage 8 and the outer peripheral surface 4a of the inner joint member 4 is set such that it is narrower on the outboard side than on the inboard side. Along with this, the area of contact between the axial opposite sides of the pocket 7 in the inner peripheral surface 8b of the cage 8 and the outer peripheral surface 4a of the inner joint member 4 is set such that it is very narrow on the outboard side but wider on the inboard side than that.

Further, the inboard-side end of the cage 8 projects from the inboard-side end of the outer joint member 2, whereby the axial width of the cage 8 is made relatively long-sized. Further, the plurality of pockets 7 formed peripherally of the cage 8 at equal intervals are set so that they are all the same in size (the same in axial width and in peripheral length).

Figure 3:
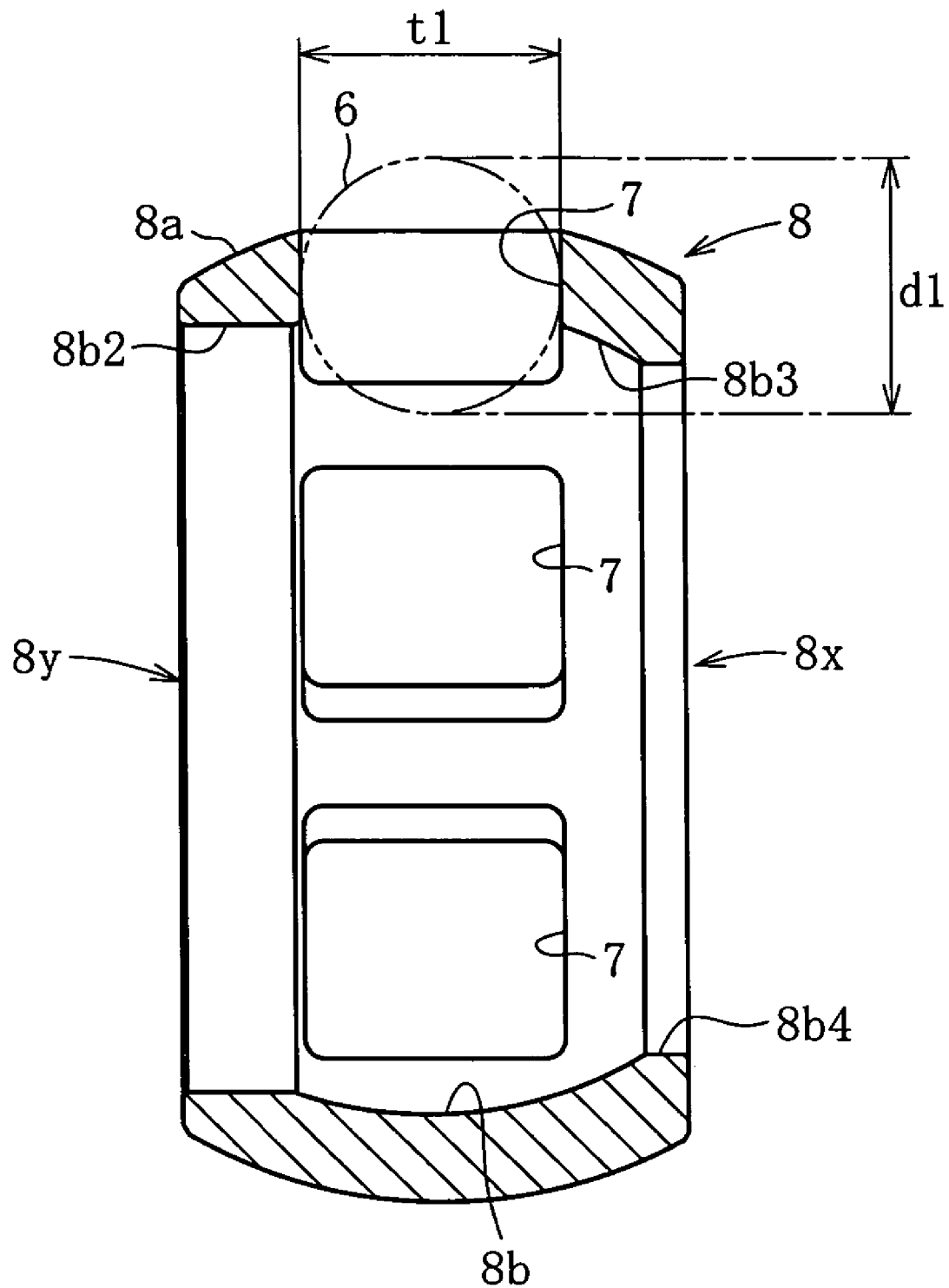
FIG. 3 is a longitudinal sectional view showing a cage which is a component element of the UJ in the drive shaft of FIG. 1.

In this case, as shown in FIG. 3, the value obtained by subtracting the diameter $d_1$ of the torque transmitting ball 6 from the axial width t1 of the pocket 7 of the cage 8 (before the torque transmitting balls 6 are fitted), that is, the axial pocket clearance δ between the pocket 7 of the cage 8 and the torque transmitting ball 6 is set such that $-30\ \mu m \leq \delta \leq 0\ \mu m$. More preferably, this axial pocket clearance δ is set such that $-20\ \mu m \leq \delta < 0\ \mu m$. In addition, the torque transmitting balls 6 are fitted in the pockets 7 of the cage 8 in such a manner as to be peripherally slightly movable.

And, this cage 8 is made of such steel as chromium steel or chromium molybdenum steel. The production method thereof, stated roughly, comprises the steps, for example, of forming the basic shape (annulus) of the cage 8 as by press work, effecting window-punching for the pockets 7, hardening the cage, and cutting or grinding the portion which was originally the inner peripheral surface (the uncut or unground inner peripheral surface after window-punching) of the pockets 7 formed by said window-punching, thereby finally obtaining the inner peripheral surfaces of the pockets 7.

As described above, if the axial pocket clearance δ between the pocket 7 of the cage 8 and the torque transmitting ball 6 is greater than $-30\ \mu m$ (preferably, $-20\ \mu m$), it becomes easier for the torque transmitting ball 6 to roll in the pocket 7 and the bending resistance or load is suitably reduced when this type of joint takes working angles, so that steerability is improved. Further, since this axial pocket clearance δ is smaller than 0 μm, the function of the cage 8 for guiding the torque transmitting balls 6 is smoothly exhibited, the operability or constant velocity nature of this kind of joint is satisfactorily maintained, and abnormal sound or a feeling of being caught becomes less liable to occur, improving steering feeling.

Furthermore, in producing the cage 8, cutting or grinding is effected after hardening, thereby making it possible to avoid, as much as possible, the inner peripheral surfaces of the pockets 7 being formed with a taper or strains being produced, and to form pockets 7 which suppress variation, dimensional errors, and deformation; thus, suitable axial pocket clearance δ can be stably obtained.

Figure 4:
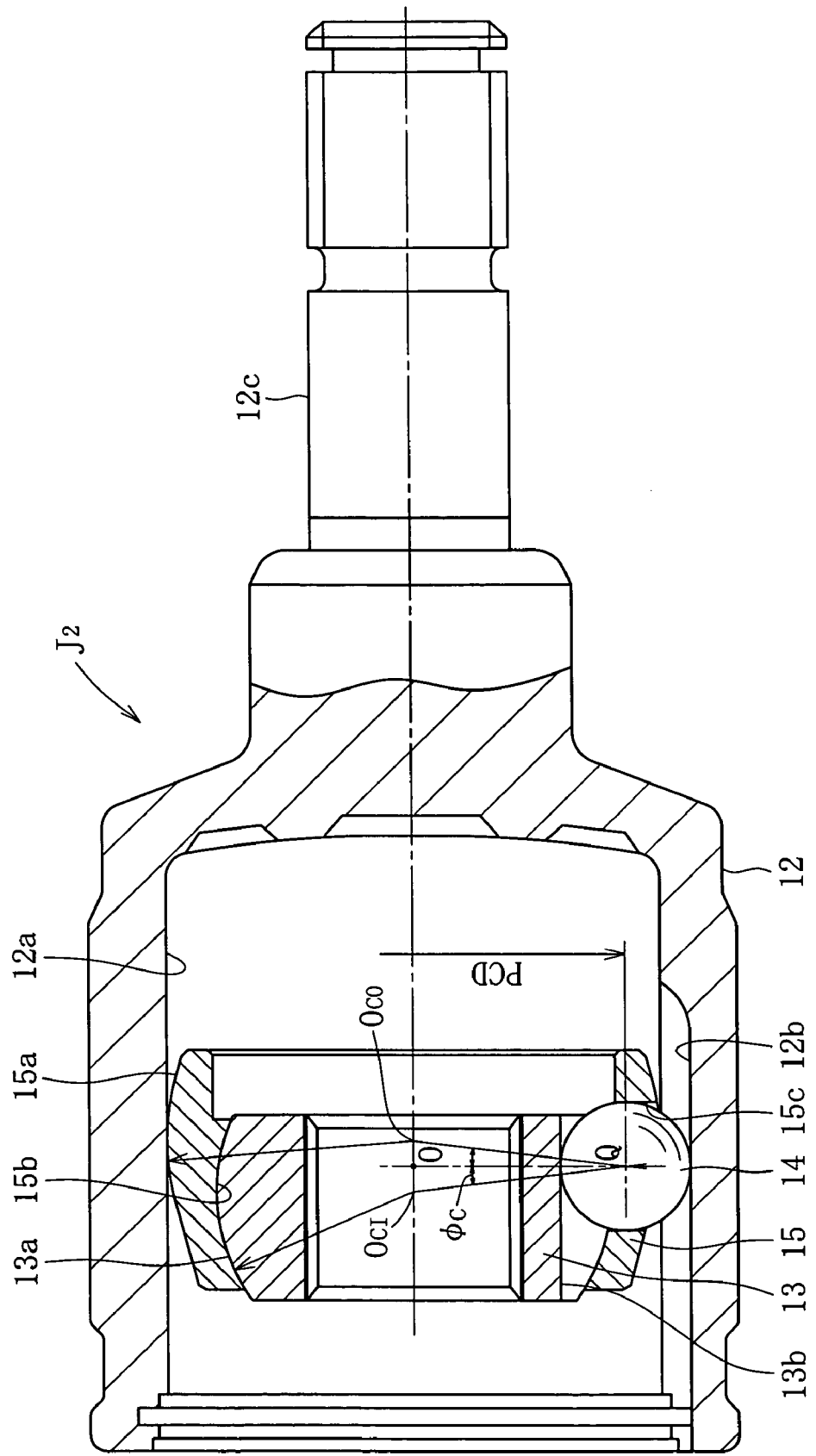
FIG. 4 is a longitudinal sectional view showing a DOJ in the drive shaft of FIG. 1.

On the other hand, the constant velocity joint $J_2$ on the inboard side is constituted by a double offset type constant velocity joint (DOJ). The DOJ, as shown in FIG. 4, comprises an outer joint member (outer ring) 12 with a cylindrical inner peripheral surface 12a axially formed with a plurality (for example, six) of linear track grooves 12b, an inner joint member (inner ring) 13 with a spherical outer peripheral surface 13a axially formed with a plurality (for example, six) of linear track grooves 13b, a plurality (for example, six) of torque transmitting balls 14 disposed in ball tracks formed by cooperation between the track grooves 12b of the outer joint member 12 and the track grooves 13b of the inner joint member 13, and a cage 15 holding the torque transmitting balls 14. The stem 12c of the outer joint member 12 is joined to a differential gear, and the intermediate shaft 1 is joined to the inner periphery of the inner joint member 13 through serrations or the like.

The cage 15 is an annulus comprising an outer spherical surface 15a contactually guided by the inner peripheral surface 12a of the outer joint member 12, an inner spherical surface 15b contactually guided by the outer peripheral surface 13a of the outer joint member 13, a plurality (for example, six) of pockets 15c receiving the torque transmitting balls 14. The spherical surface center $O_{CO}$ of the outer spherical surface 15a and the spherical surface center $O_{CI}$ of the inner spherical surface 15b are offset by an equal distance to axially opposite sides with respect to the joint center O.

When this joint is transmitting torque while assuming working angles, the cage 15 rotates to the position of the torque transmitting balls 15 moving on the ball tracks depending on the inclination of the inner joint member 13, and holds the torque transmitting balls 14 in a plane bisecting the working angle. Thereby, the constant velocity nature of the joint is secured. Further, when the outer and inner joint members 12 and 13 relatively axially move, slip occurs between the outer spherical surface 15a of the cage 15 and the inner peripheral surface 12a of the outer joint member 12, thus allowing smooth axial movement (plunging).

The allowable maximum working angle of the DOJ disposed on the inboard side is set to be smaller than that of the constant velocity joint UJ on the outboard side; for example, it is set at 30.5°.

In said DOJ, the cage offset angle φc ($\angle O_{CO}QO$ or $\angle O_{CI}QO$) defined by the spherical surface center $O_{CO}$ of the outer spherical surface 15a of the cage, ball center Q, and joint center O is set so that $7° \leq \phi c < 9°$. This cage offset angle φc has been not less than 9° for DOJs of conventional passenger car specifications; herein, however, it is set to be smaller than the conventional value in order to attain reduction of weight and size compaction. Even if the cage offset angle φc is reduced like this and if durability is set at 70% of the value for passenger car specifications, the track groove depth of the inner and outer joint members can be shallowed, whereby the material thickness of the cage 15 can be increased, making it possible to reliably prevent the balls 14 from jumping out of the cage pockets 15c when the joint takes the allowable maximum working angle.

In said outboard-side constant velocity joint $J_1$ (UJ) and inboard-side constant velocity joint $J_2$ (DOJ), the difference between the PCD of the outer joint member and the PCD of the inner joint member, that is, the track clearance, is set in the range of 20-200 μm. In addition, in FIG. 2, the PCD of the track grooves 2b of the outer joint member 2 and the PCD of the track grooves 3b of the inner joint member 3 are shown as if they were the same for convenience. Therefore, the outer and inner joint members with their track grooves cold forged can be used without involving matching. Specifically, with the case of a UJ taken as an example, the outer joint member is produced through a set of processing steps, forging→turning→serrating→thread rolling→high frequency hardening→spherical surface grinding. The inner joint member has been produced through a set of processing steps, forging→turning→serrating broaching→carburizing and quenching→spherical surface grinding.

The opposite ends of the intermediate shaft 1 are formed with serration shafts which are torque-transmittably joined to serration holes in the inner joint member 4 of the outboard-side constant velocity joint $J_1$ (UJ) and in the inner joint member 13 of the inboard-side constant velocity joint $J_2$ (DOJ). A description will be given of the outboard side. As shown in FIG. 2, a circlip 9 is fitted in an annular groove formed in the front end of the intermediate shaft 1, thereby providing slip-off prevention of the inner joint member 4 and intermediate shaft 1. And, the serration shaft of the intermediate shaft 1 and the serration hole 4c in the inner joint member 4 may be clearance-fitted. The intension is to make it possible to easily separate the intermediate shaft 1 and the inner joint member 4 from each other by forcibly pulling out the intermediate shaft 1 from the inner joint member 4 so as to diametrically contract the circlip 9. This facilitates disassembly and repair, inspection, etc., of the drive shaft.

The drive shaft described so far can be used not only for the front side but also for the rear side of the ATV.

Figure 5:
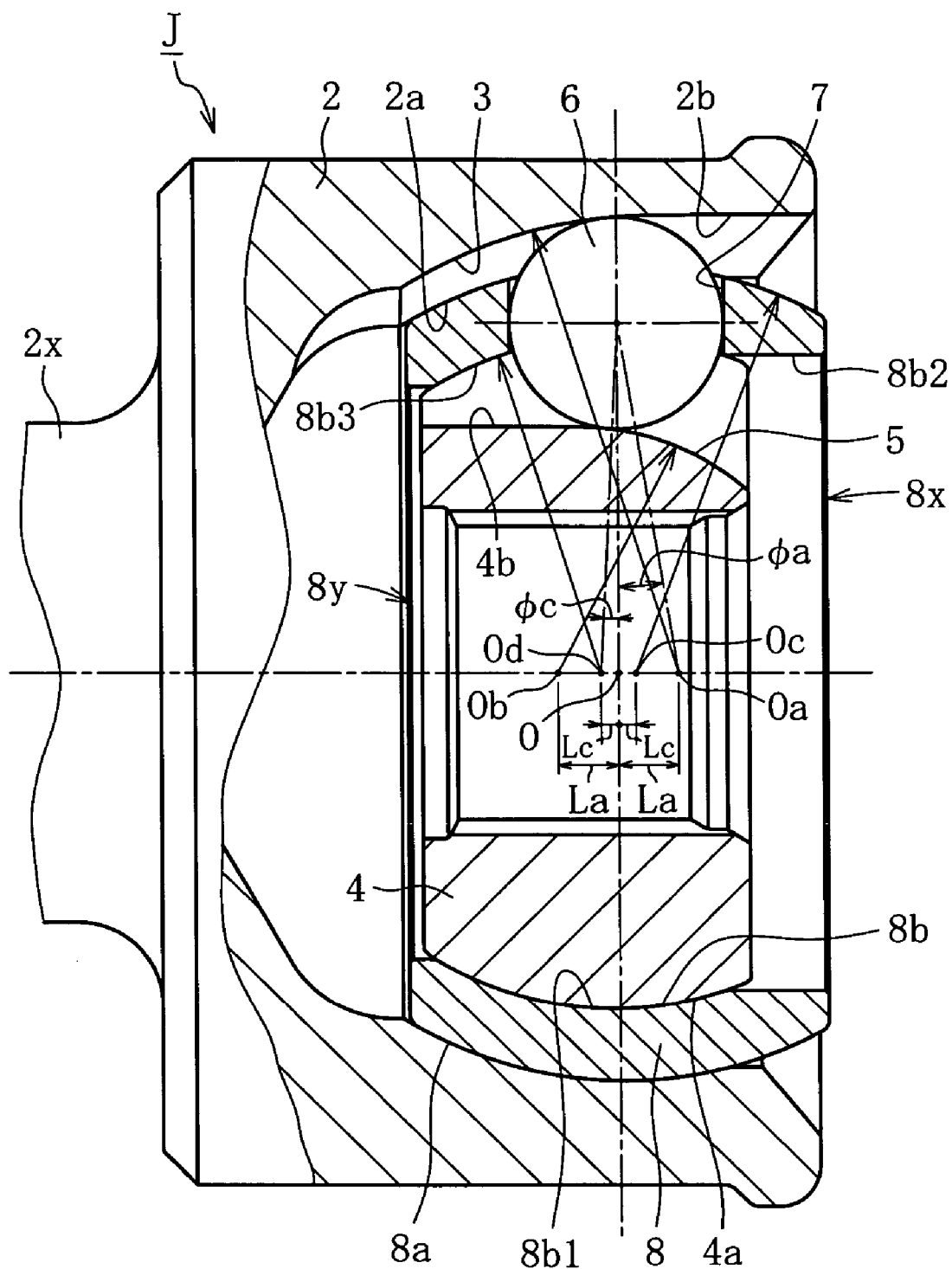
FIG. 5 is a longitudinal sectional view showing another example of UJ in the drive shaft of FIG. 1.

Further, the constant velocity joint $J_1$ on the outboard side may be an undercut free type constant velocity joint arranged as shown in FIG. 5 (in a state assumed when the working angle θ is 0°). The constant velocity joint shown in FIG. 5 differs from the already described constant velocity joint on the outboard side shown in FIG. 2 in that the cage 8 is axially oppositely incorporated, that is, the relatively large diameter opening 8x in the cage 8 is positioned on the inboard side while the relatively small diameter opening 8y is positioned on the outboard side. The rest of the arrangement is the same as in the already described constant velocity joint, so that in FIG. 5, like reference characters are given to common constituent elements to omit a description thereof. And, also the constant velocity joint shown in FIG. 5 can enjoy the same effects as those of the already descried outboard-side constant velocity joint.

What is claimed is:

1. An ATV drive shaft installed in an uneven terrain traversing, mounted type vehicle and adapted to transmit drive power to wheels through constant velocity joints on the inboard and outboard sides, the drive shaft comprising:
    a double offset type constant velocity joint used on the inboard side and an undercut free type constant velocity joint used on the outboard side;
    wherein said constant velocity joints each comprise:
        an outer joint member having a plurality of track grooves in an inner circumferential surface,
        an inner joint member having a plurality of track grooves in a spherical outer circumferential surface,
        torque transmitting balls disposed in a plurality of ball tracks formed by the opposing track grooves of both of said joint members, and
        a cage interposed between both of said joint members and holding said torque transmitting balls; and
    a track clearance of each of said constant velocity joints is in a range of 20 μm -200 μm, wherein said track clearance is defined by a difference between a pitch circle diameter (PCD) of the outer joint member and a pitch circle diameter (PCD) of the inner joint member.

2. An undercut free type constant velocity joint comprising an outer joint member disposed on the outboard side of a drive shaft for transmitting drive power to a wheel in a vehicle with no power steering and having a plurality of track grooves in a spherical inner peripheral surface, an inner joint member having a plurality of track grooves in a spherical outer peripheral surface, torque transmitting balls disposed in a plurality of ball tracks formed by the opposed track grooves of both joint members, and a cage interposed between both joint members and receiving and holding said torque transmitting balls in a plurality of window-shaped pockets, the undercut free type constant velocity joint being characterized in that the track groove centers of said outer and inner joint members and the inner and outer spherical surface centers of said cage are axially offset with the joint center serving as a reference and in that the offset angles of the spherical surfaces of said cage are set to be greater than 0° but less than 1°.

3. The constant velocity joint as set forth in claim 2, characterized in that the offset angles of the track grooves of said outer and inner joint members are set to be 4°-6°.

4. The constant velocity joint as set forth in claim 2, characterized in that the inboard-side end of said cage projects from the inboard-side end of said outer joint member in the state of the working angle being 0°.

5. The constant velocity joint as set forth in claim 3, characterized in that the inboard-side end of said cage projects from the inboard-side end of said outer joint member in the state of the working angle being 0°.

6. The constant velocity joint as set forth in claim 2, characterized in that the plurality of window-shaped pockets of said cage are formed to be all the same in size.

7. The constant velocity joint as set forth in claim 3, characterized in that the plurality of window-shaped pockets of said cage are formed to be all the same in size.

8. The constant velocity joint as set forth in claim 4, characterized in that the plurality of window-shaped pockets of said cage are formed to be all the same in size.

9. The constant velocity joint as set forth in claim 5, characterized in that the plurality of window-shaped pockets of said cage are formed to be all the same in size.

10. The constant velocity joint as set forth in claim 9, characterized in that the joint is installed in an uneven terrain traversing, mounted type vehicle.

11. An undercut free type constant velocity joint comprising:
  an outer joint member disposed on the outboard side of a drive shaft for transmitting drive power to a wheel in a vehicle with no power steering and having a plurality of track grooves in a spherical inner peripheral surface,
  an inner joint member having a plurality of track grooves in a spherical outer peripheral surface,
  torque transmitting balls disposed in a plurality of ball tracks formed by the opposed track grooves of both joint members, and
  a cage interposed between both joint members and receiving and holding said torque transmitting balls in a plurality of window-shaped pockets,
  wherein an axial clearance $\delta$ between the cage pocket and the torque transmitting ball is set so that $-30\,\mu m \leqq \delta 0\,\mu m$.

12. The constant velocity joint as set forth in claim 11, characterized in that said cage is made of steel, and the inner peripheral surfaces of the pockets are formed by cutting or grinding the original inner peripheral surfaces of hardened pockets.

13. The constant velocity joint as set forth in claim 11, characterized in that the inboard-side end of said cage projects from the inboard-side end of said outer joint member in the state of the working angle being 0°.

14. The constant velocity joint as set forth in claim 12, characterized in that the inboard-side end of said cage projects from the inboard-side end of said outer joint member in the state of the working angle being 0°.

15. The constant velocity joint as set forth in claim 11, characterized in that the plurality of window-shaped pockets of said cage are formed to be all the same in size.

16. The constant velocity joint as set forth in claim 12, characterized in that the plurality of window-shaped pockets of said cage are formed to be all the same in size.

17. The constant velocity joint as set forth in claim 13, characterized in that the plurality of window-shaped pockets of said cage are formed to be all the same in size.

18. The constant velocity joint as set forth in claim 14, characterized in that the plurality of window-shaped pockets of said cage are formed to be all the same in size.

19. The constant velocity joint as set forth in claim 18, characterized in that the joint is installed in an uneven terrain traversing, mounted type vehicle.

* * * * *